United States Patent [19]

Atanasovski

[11] 4,278,626
[45] Jul. 14, 1981

[54] METHOD OF CASTING PHOTOGRAPHS IN DOME-SHAPED STRUCTURES

[76] Inventor: Marin Atanasovski, 187 Harvard St., Malden, Mass. 02148

[21] Appl. No.: 66,015

[22] Filed: Aug. 13, 1979

[51] Int. Cl.³ .............................. B29C 5/00; B29D 3/00
[52] U.S. Cl. .................................. 264/40.1; 264/255; 264/271.1
[58] Field of Search ...................... 264/255, 271, 271.1; 156/58, 309, 581, 109; 428/11, 13; 430/DIG. 961; 427/430.1; 425/40.1

[56] References Cited

U.S. PATENT DOCUMENTS

| | | | |
|---|---|---|---|
| 688,302 | 12/1901 | Grether | 156/87 |
| 2,300,495 | 11/1942 | Gerhart | 428/13 |
| 2,332,674 | 10/1943 | Smith | 264/40.2 |
| 3,130,099 | 4/1964 | Homburger | 156/309 |
| 3,312,197 | 4/1967 | Smith | 428/13 |
| 3,518,137 | 6/1970 | Hamilton | 156/104 |
| 3,566,521 | 3/1971 | Conner | 156/309 |
| 3,657,405 | 4/1972 | Langecker | 264/509 |
| 3,660,211 | 5/1972 | Brody | 264/271 |
| 3,759,478 | 9/1973 | Schmitt et al. | 249/134 |
| 3,964,946 | 6/1976 | Falk | 156/59 |
| 4,067,737 | 1/1978 | Lewis | 430/961 |

OTHER PUBLICATIONS

Anon., Rohm & Haas, "Embedding Biological Specimens in Acrylic Plastic", (1947), Phila., PA., pp. 1-5, relied on.

*Primary Examiner*—W. E. Hoag
*Attorney, Agent, or Firm*—Thompson, Birch, Gauthier & Samuels

[57] ABSTRACT

A process for embedding photographs in dome-shaped transparent castings. Casting material is charged into a mold. A portion of the photograph is applied to the surface. The migration of gases from the casting material is monitored. As the gases migrate from the casting material, the photograph is continually applied over the surface. Subsequently, the mold is charged with additional casting material forming a completely embedded photograph in a dome-shaped casting which is transparent and free from bubbles.

2 Claims, 3 Drawing Figures

METHOD OF CASTING PHOTOGRAPHS IN DOME-SHAPED STRUCTURES

BACKGROUND AND BRIEF SUMMARY OF THE INVENTION

The present invention relates to casting two dimensional pictorial displays in transparent plastic.

Many novelty items, such as paperweights, ornaments, etc., are comprised of transparent plastic or glass having embedded therein various two and three dimensional displays flowers, shells, coins, etc. The transparent castings when fully cured form a single integral article and differentiate from those articles wherein a two dimensional display is laminated or sandwiched between flat surfaces.

For these integral castings the casting material, such as commercially available CLEAR CAST is poured into a mold and the display to be embedded is either inserted during the charging of the mold or immediately thereafter. Typically, the mold is open such that gases may escape which are generated during curing. Photographs have been embedded in such castings but the geometric configurations of such castings are limited. Typically, such two dimensional pictorial displays have only been embedded in square or rectangular castings, the final casting having planar surfaces.

With photographs, it is desirable to have the outer periphery of the photograph substantially coterminus with the casting periphery because of the size of the photograph. That is, where the casting is used as an ornament or paperweight, if the size of the casting is much larger than the actual photograph it becomes unwieldly and expensive. Also, with photographs for ascetic purposes, it is desirable to have a non-planar upper surface whereby the photograph is magnified and free of bubbles.

Previous attempts to embed a photograph in a hemisphere or dome-shaped casting have failed. Typically, the photograph is of such size that it covers substantially the entire base of the dome. The gases cannot escape during curing which results in the final casting having bubbles thus distorting the view of the photograph.

My invention relates to a method and an article produced thereby for embedding a photograph or other two dimensional visual display in an integrally formed transparent dome-shaped casting which photograph is substantially coextensive with the base of the dome.

My invention broadly includes charging a mold with casting material, the mold in the shape of an inverted dome, until substantially full; overlaying the uncured casting with a two dimensional pictorial display, the outer periphery of the representation less than the outer periphery of the casting; engaging a portion of the surface of the casting with the display; monitoring the migration of gases from the casting and based on the migration of the gases, continually overlaying the representation until it is fully engaged to the surface of the uncured casting; and subsequently, adding casting material to completely embed the photograph.

BRIEF DISCRIPTION OF THE DRAWINGS

DESCRIPTION OF THE PREFERRED EMBODIMENT

Figure 1:
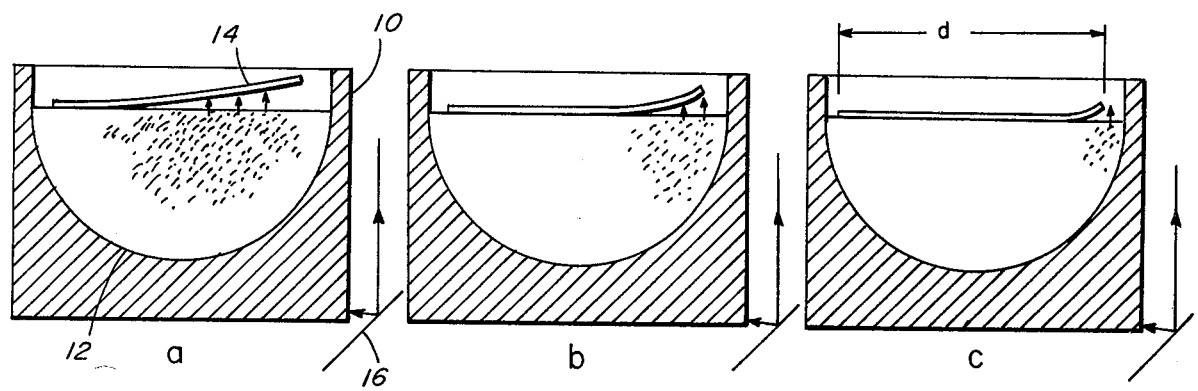
FIGS. 1a, 1b and 1c are front illustrations of the method of the invention.

Referring to FIG. 1a, a clear mold 10 such as a glass mold having a dome-shaped cavity 12 is charged with a transparent casting material, such as CLEAR CAST. As shown in FIG. 1a, a portion of a circular photograph 14 contacts the surface of the uncured casting. While curing, the gases in the form of bubbles must escape from the casting material in order for a clear casting to result. The bubbles migrate to the non-engaged portion of the surface. A mirror 16 is positioned adjacent the mold in order that the clarity (gas migration) of the casting material must be viewed. As shown in FIGS. 1b and 1c, as the gases migrate from the casting through the non-engaged portion of the surface, more of the photograph is continually overlayed on the surface. When substantially all of the gases have escaped, then the entire photograph overlays the cast surface.

Although a mirror is used for convenience, other means of viewing the migration of gases, such as through the use of instrumentation measuring clarity, may be used.

Figure 2:
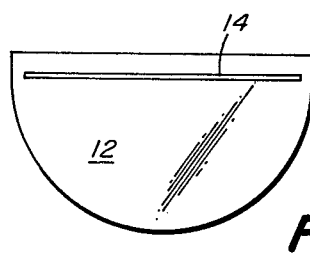
FIG. 2 is a front illustration of the final casting.

In FIG. 2, the mold is shown fully charged thus completely embedding the photograph 14. The portion of the dome above the display is transparent and bubble free.

Figure 3:
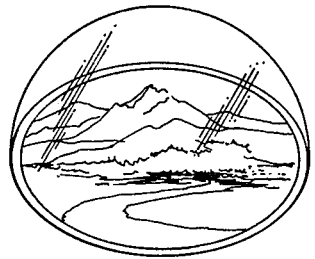
FIG. 3 is a perspective view of the final casting.

In FIG. 3, the final casting is illustrated.

The description of the preferred embodiment has been described in reference to a circular photograph, the perimeter of the photograph being substantially coextensive with the perimeter of the casting. Of course, a rim of casting material is formed about the edge of the photograph as shown in FIGS. 2 and 3. Although ascetically it is preferred to use substantially circular photographs for the dome-shaped castings, square, diamond-shaped or other two dimensional pictorial displays may be used. The invention is primarily intended for those castings where the pictorial display represents more than half of the cross-sectional area of the engaged surface (diameter d FIG. 1) of the casting and more typically, 80–90% of the engaged surface. Also, any other suitable casting materials having chemical and physical properties akin to that disclosed in the preferred embodiment, namely CLEAR CAST #76-102 manufactured by Pandy-Crafts, Inc., of Forth Worth, Texas may be used.

Having described my invention, what I now claim is:

1. A method of embedding a two dimensional pictorial display in a dome-shaped casting which includes in sequence:
   (a) charging a dome-shaped transparent mold with casting material, the exposed portion of the material as charged forming the surface which the display will engage and through which the display will be viewed;
   (b) contacting the surface of the casting with a portion of a planar display;
   (c) monitoring the migration of gas from the casting;
   (d) overlaying continually the display on the surface as the gas escapes from within the material, the display comprising more than 50% of the surface air of the casting;
   (e) engaging the entire display to the surface when substantially all of the gas has escaped;
   (f) charging subsequent to step (e) the mold with further casting material subsequent to the material charged in step (a) curing to embed the display in the casting and to form an integral casting;
(g) positioning said mirror adjacent to said mold;
(h) reflecting an image of the casting material on said mirror; and
(i) viewing the image reflected from said mirror as said overlying progresses.

2. The method of claim 1 wherein the display comprises between 80-90% of the surface reaa of the base.

* * * * *